US009350235B2

(12) United States Patent  (10) Patent No.: US 9,350,235 B2
Cheng et al.  (45) Date of Patent: May 24, 2016

(54) SWITCHED CAPACITOR VOLTAGE CONVERTING DEVICE AND SWITCHED CAPACITOR VOLTAGE CONVERTING METHOD

(71) Applicant: ILI TECHNOLOGY CORPORATION, Jhubei, Hsinchu County (TW)

(72) Inventors: Wei-Chung Cheng, Jhubei (TW); Ching-Tsao Chen, New Taipei (TW); Chih-Hsiang Chuang, Luodong Township, Yilan County (TW)

(73) Assignee: ILI TECHNOLOGY CORPORATION, Jhubei (TW)

( * ) Notice: Subject to any disclaimer, the term of this patent is extended or adjusted under 35 U.S.C. 154(b) by 153 days.

(21) Appl. No.: 14/265,399

(22) Filed: Apr. 30, 2014

(65) Prior Publication Data

US 2014/0328095 A1  Nov. 6, 2014

(30) Foreign Application Priority Data

May 1, 2013 (TW) .............................. 102115592 A

(51) Int. Cl.
*H02M 3/07* (2006.01)
(52) U.S. Cl.
CPC ....................................... *H02M 3/07* (2013.01)
(58) Field of Classification Search
CPC . H02M 3/07; H02M 2003/071; H02M 3/073; H02M 2003/077
See application file for complete search history.

(56) References Cited

U.S. PATENT DOCUMENTS

| 7,173,478 | B2* | 2/2007 | Chun | H02M 3/07 327/536 |
| 7,282,985 | B2* | 10/2007 | Yen | H02M 3/07 307/110 |
| 7,511,977 | B2* | 3/2009 | Oyama | H02M 3/07 307/109 |
| 7,786,791 | B2* | 8/2010 | Park | H02M 1/088 327/536 |
| 7,851,946 | B2* | 12/2010 | Oyama | H02M 3/07 307/109 |
| 8,310,218 | B2* | 11/2012 | Williams | H02M 3/07 323/265 |
| 8,493,134 | B2* | 7/2013 | Hao | G06F 1/06 327/536 |
| 2008/0191786 | A1* | 8/2008 | Kwon | H02M 3/073 327/536 |
| 2010/0052771 | A1* | 3/2010 | Hartono | H02M 3/073 327/536 |
| 2011/0317456 | A1* | 12/2011 | Tseng | H02M 3/073 363/60 |

\* cited by examiner

*Primary Examiner* — Jeffrey Zweizig
(74) *Attorney, Agent, or Firm* — Nixon & Vanderhye P.C.

(57) ABSTRACT

A voltage converting device includes first to third voltage converters, each including a capacitor, a pair of charge switches for charging the capacitor, a pair of first output switches for outputting a first output voltage through the capacitor, and a pair of second output switches for outputting a second output voltage through the capacitor. Via timing control of the switches, outputs of the first and second output voltages are substantially continuous and are prevented from floating.

6 Claims, 9 Drawing Sheets

SWITCHED CAPACITOR VOLTAGE CONVERTING DEVICE AND SWITCHED CAPACITOR VOLTAGE CONVERTING METHOD

CROSS-REFERENCE TO RELATED APPLICATION

This application claims priority to Taiwanese Application No. 102115592, filed on May 1, 2013.

BACKGROUND OF THE INVENTION

1. Field of the Invention

The invention relates to a voltage converting device and a voltage converting method, and more particularly to a switched capacitor voltage converting device and a switched capacitor voltage converting method.

2. Description of the Related Art

A conventional switched capacitor voltage converting device is shown in FIG. 1 to include two switched capacitor voltage converters 11, 12, and a capacitor Cout for stabilization of an output voltage Vout of the switched capacitor voltage converting device. Each of the switched capacitor voltage converters 11, 12 includes four switches M1 to M4 and a capacitor C having first and second terminals. The stabilization capacitor Cout has a first terminal coupled to the switched capacitor voltage converters 11, 12, and a grounded second terminal.

The switch M1 has a first terminal to receive an input voltage Vin, and a second terminal coupled to the first terminal of the capacitor C.

The switch M2 has a first terminal that outputs the output voltage Vout and that is coupled, to the first terminal of the stabilization capacitor Cout, and a second terminal coupled to the first terminal of the capacitor C.

The switch M3 has a grounded first terminal and a second terminal coupled to the second terminal of the capacitor C.

The switch M4 has a first terminal to receive the input voltage Vin, and a second terminal coupled to the second terminal of the capacitor C.

In this case, the switches M1, M2 and M4 of each of the switched capacitor voltage converters 11, 12 are P-type MOSFETS, and the switch M3 of each of the switched capacitor voltage converters 11, 12 is an N-type MOSFET.

FIG. 2 shows a timing diagram for controlling the switches of the switched capacitor voltage converting device, wherein signals PH1 and PH1B are complementary, and signals PH2 and PH2B are complementary. The switch M1 of the switched capacitor voltage converter 11, and the switches M2, M4 of the switched capacitor voltage converter 12 are controlled using the signal PH1B. The switches M2, M4 of the switched capacitor voltage converter 11, and the switch M1 of the switched capacitor voltage converter 12 are controlled, using the signal PH2B. The switch M3 of the switched capacitor voltage converter 11 is controlled using the signal PH1. The switch M3 of the switched capacitor voltage converter 12 is controlled using the signal PH2.

Each of the switched capacitor voltage converters 11, 12 is switched among a charging state in which the switches M1 and M3 are closed and the switches M2 and M4 are open, a floating state in which all of the switches M1 to M4 are open, and an output state in which the switches M1 and M3 are open and the switches M2 and M4 are closed. In the charging state, the capacitor C is charged to the voltage Vin. In the output state, the capacitor C outputs the output voltage Vout that is equal to 2Vin.

The conventional switched capacitor voltage converting device operates periodically in four sequential durations as follows.

In a first operating duration, the switched capacitor voltage converter 11 operates in the charging state and the switched capacitor voltage converter 12 operates in the output state.

In a first transition duration, both of the switched capacitor voltage converters 11, 12 operate in the floating state.

In a second operating duration, the switched capacitor voltage converter 11 operates in the output state and the switched capacitor voltage converter 12 operates in the charging state.

In a second transition duration, both of the switched capacitor voltage converters 11, 12 operate in the floating state.

In the first and second transition durations, since both of the switched capacitor voltage converters 11, 12 operate in the floating state, the output voltage Vout must be stabilized using the stabilization capacitor Cout for preventing voltage drift.

Accordingly, the conventional switched capacitor voltage converting device uses two switched capacitor voltage converters and a stabilization capacitor to output a stable output voltage. When N output voltages are required, the conventional switched capacitor voltage converting device may use 2N switched capacitor voltage converters that include 2N capacitors C and N stabilization capacitors Cout. The large number of capacitors may result in high cost regardless of whether external capacitor components or capacitors integrated into circuits (large circuit area may be required) are used.

SUMMARY OF THE INVENTION

Therefore, an object of the present invention is to provide a switched capacitor voltage converting device that may have relatively low cost and small circuit area.

According to one aspect of the present invention, a voltage converting device comprises a first voltage converter, a second voltage converter, and a third voltage converter. Each of the first voltage converter, the second voltage converter and the third voltage converter includes:

a capacitor having a pair of capacitor terminals;

a pair of charge switches each having a first terminal and a second terminal, the first terminals of the charge switches being coupled respectively to the capacitor terminals, the second terminals of the charge switches being disposed to receive first and second charge voltages, respectively;

a pair of first output switches each having a first terminal, and a second terminal, the first terminals of the first output switches being coupled respectively to the capacitor terminals, the second terminal of one of the first output switches being disposed to receive a first input voltage, the second terminal of the other one of the first output switches being disposed to output a first output voltage; and a pair of second output switches each having a first terminal and a second terminal, the first terminals of the second output switches being coupled respectively to the capacitor terminals, the second terminal of one of the second output switches being disposed to receive a second input voltage, the second terminal of the other one of the second output switches being disposed to output a second output voltage.

Another object of the present invention is to provide a voltage converting method to be implemented by the voltage converting device of this invention.

According to another aspect of the present invention, a voltage converting method is to be implemented by the voltage converting device of this invention. Each of the first voltage converter, the second voltage converter and the third voltage converter of the voltage converting device is operable to switch among a first state to output one of the first output voltage and the second output voltage, a second state to output the other one of the first output voltage and the second output voltage, and a charging state. The voltage converting method comprises the steps of:

a) switching the first voltage converter to the first state, switching the third voltage converter to the second state, and switching the second voltage converter to the charging state in the given sequence;

b) switching the second voltage converter to the first state, switching the first voltage converter to the second state, and switching the third voltage converter to the charging state in the given sequence; and c) switching the third voltage converter to the first state, switching the second voltage converter to the second state, and switching the first voltage converter to the charging state in the given sequence.

Yet another object of the present invention is to provide a voltage converting method to be implemented by a voltage converting device.

According to yet another aspect of the present invention, a voltage converting method is to be implemented by a voltage converting device that includes a first voltage converter, a second voltage converter and a third voltage converter. Each of the first voltage converter, the second voltage converter and the third voltage converter is operable to switch among a first voltage output state, a second voltage output state, and a charging state. The voltage converting method comprises the steps of:

a) switching the first voltage converter to the first voltage output state, switching the third voltage converter to the second voltage output state, and switching the second voltage converter to the charging state in the given sequence;

b) switching the second voltage converter to the first voltage output state, switching the first voltage converter to the second voltage output state, and switching the third voltage converter to the charging state in the given sequence; and c) switching the third voltage converter to the first voltage output state, switching the second voltage converter to the second voltage output state, and switching the first voltage converter to the charging state in the given sequence.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
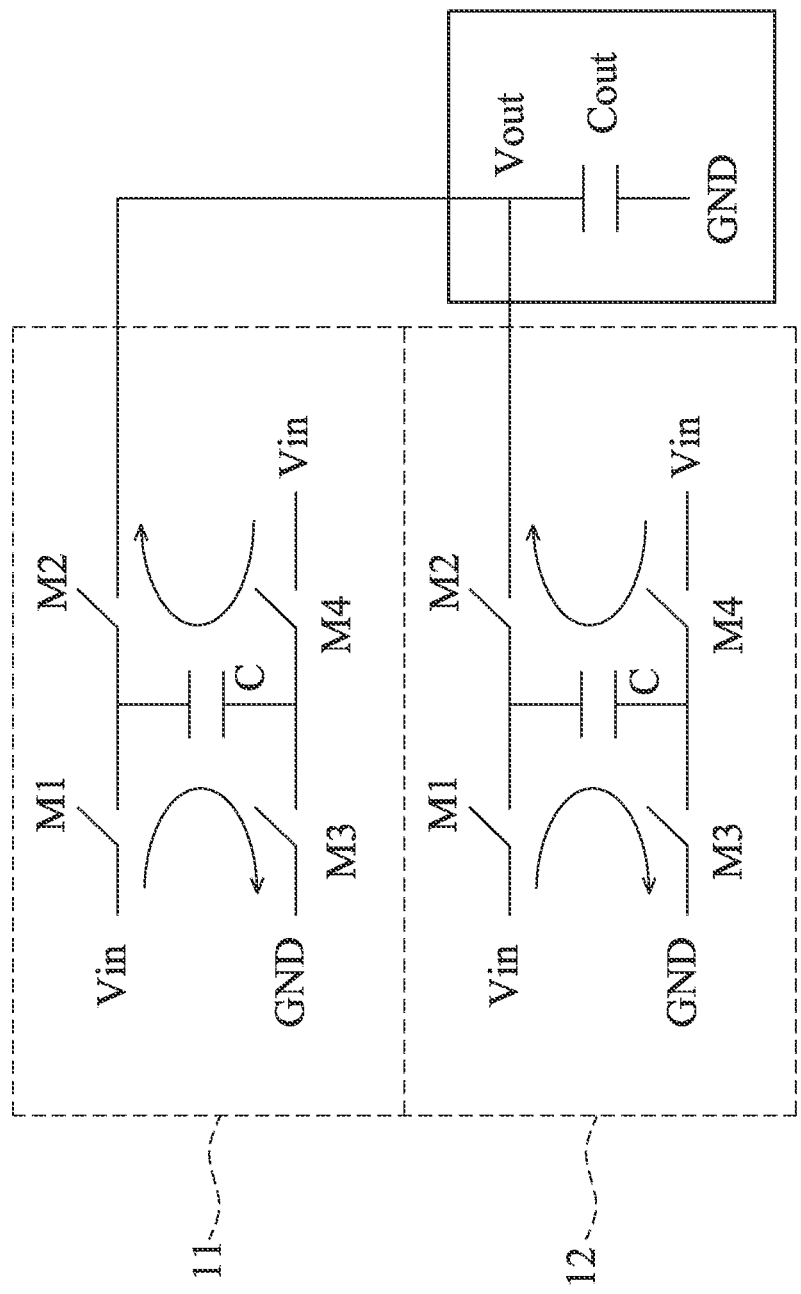
FIG. 1 is a schematic circuit diagram of a conventional switched capacitor voltage converting device.
Figure 2:
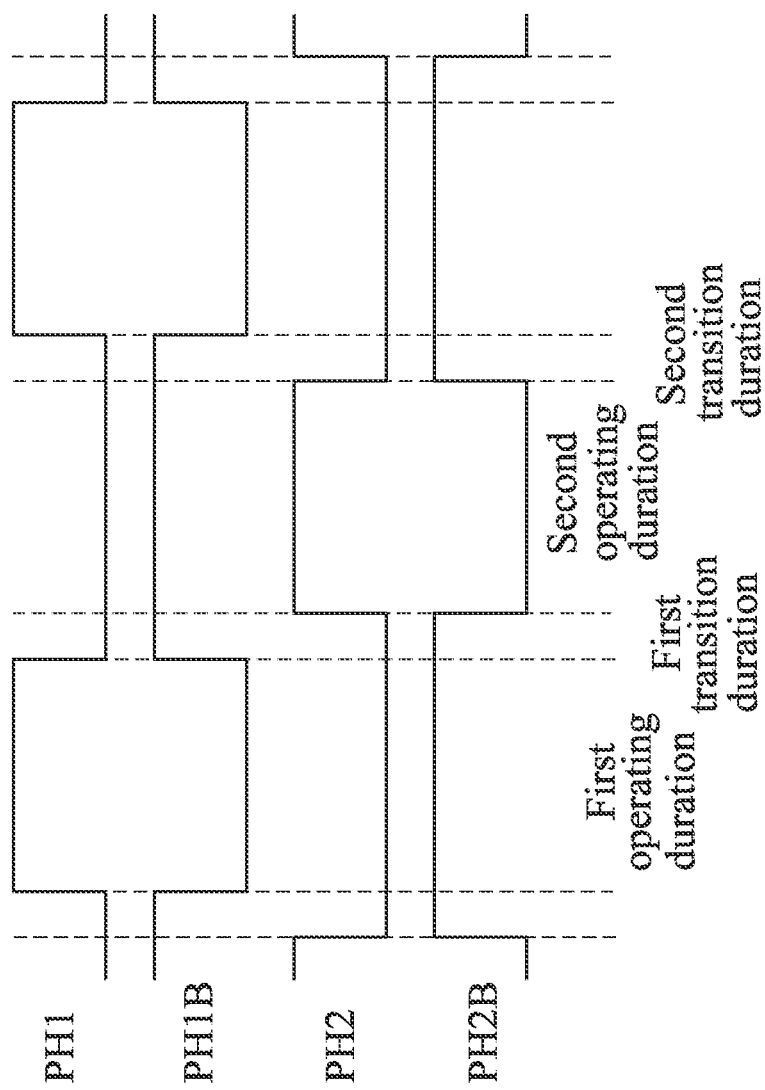
FIG. 2 is a timing diagram illustrating signals for controlling the conventional switched capacitor voltage converting device.
Figure 3:
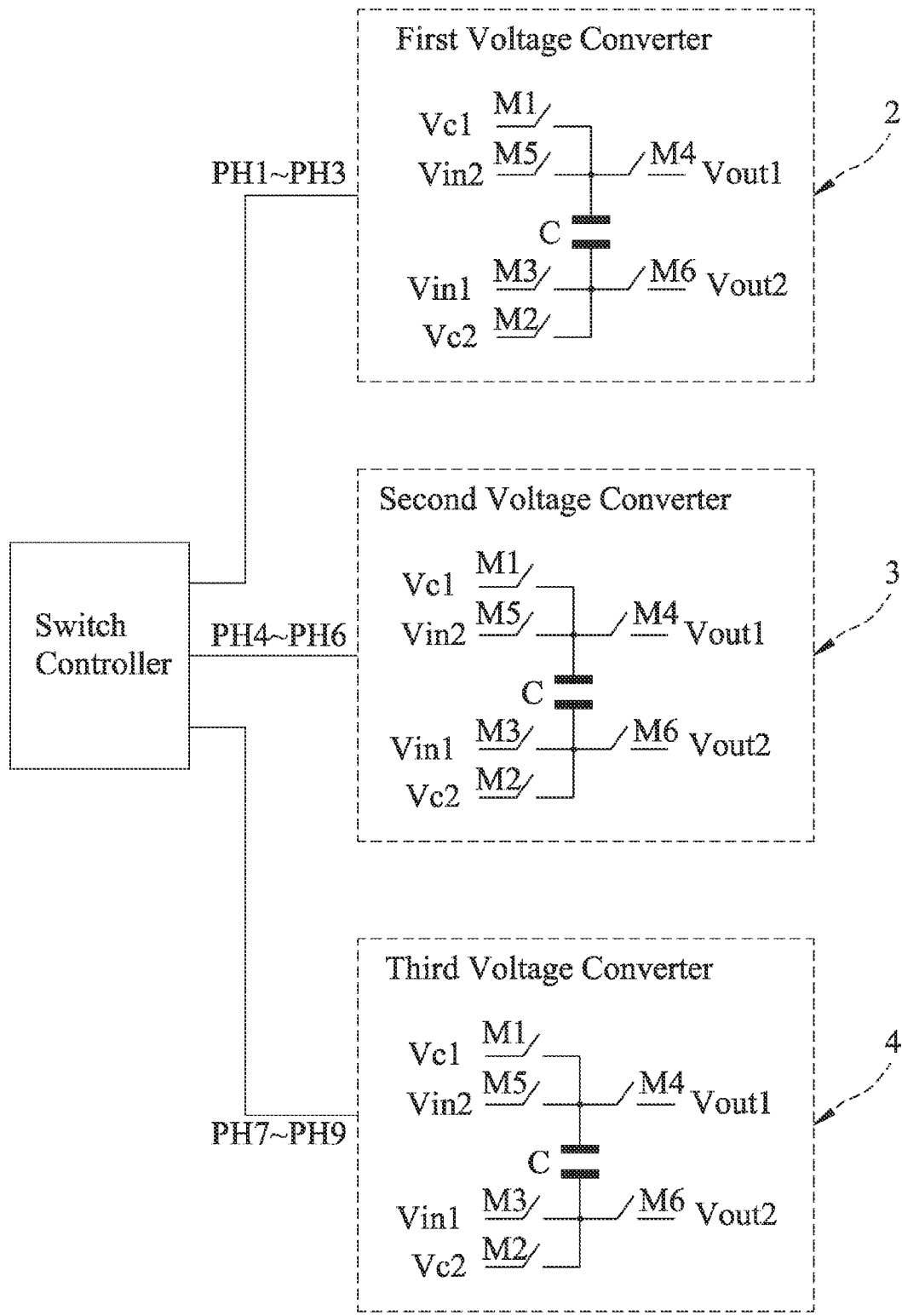
FIG. 3 is a schematic circuit diagram of a preferred embodiment of a voltage converting device according to the present invention.

Referring to FIG. 3, the preferred embodiment of the voltage converting device according to this invention is shown to be adapted for outputting two output voltages Vout1 and Vout2, and includes first to third voltage converters 2, 3, and 4. Each of the first, second and third converters 2, 3, 4 includes a pair of charge switches M1, M2, a pair of first output switches M3, M4, a pair of second output switches M5, M6, and a capacitor C having first and second capacitor terminals. Each of the switches M1 to M6 has a first terminal, and a second terminal.

The first terminals of the charge switches M1, M2 are coupled respectively to the first and second capacitor terminals. The second terminals of the charge switches M1, M2 receive first and second charge voltages Vc1, Vc2, respectively.

The first terminals of the first output switches M3, M4 are coupled respectively to the second and first capacitor terminals. The second terminal of the first output switch M3 receives a first input voltage Vin1. The second terminal of the first output switch M4 is used to output a first output voltage Vout1.

The first terminals of the second output switches M5, M6 are coupled respectively to the first and second capacitor terminals. The second terminal of the second output switch M5 receives a second input voltage Vin2. The second terminal of the second output switch M6 is used to output a second output voltage Vout2.

It should be noted that, for each of the voltage converters 2, 3, 4, each of the charge switch pair (the charge switches M1, M2), the first output switch pair (the first output switches M3, M4) and the second output switch pair (the second output switches M5, M6) operates independently. Therefore, for each of the switch pairs, the two switches therein are only required to be electrically coupled to opposite capacitor terminals of the capacitor C. That is, in other embodiments, the first terminal of the first output switch M3 may be coupled to the first capacitor terminal, and the first terminal of the first output switch M4 may be coupled to the second capacitor terminal, so that both of the first and second output voltages Vout1 and Vout2 are outputted from the same capacitor terminal (second capacitor terminal).

Furthermore, the voltage converting device may include a switch controller to control operations of the switches M1 to M6 of each of the voltage converters 2, 3, 4. Two control schemes are proposed for controlling the switches of the voltage converting device according to the present invention.

Figure 4:
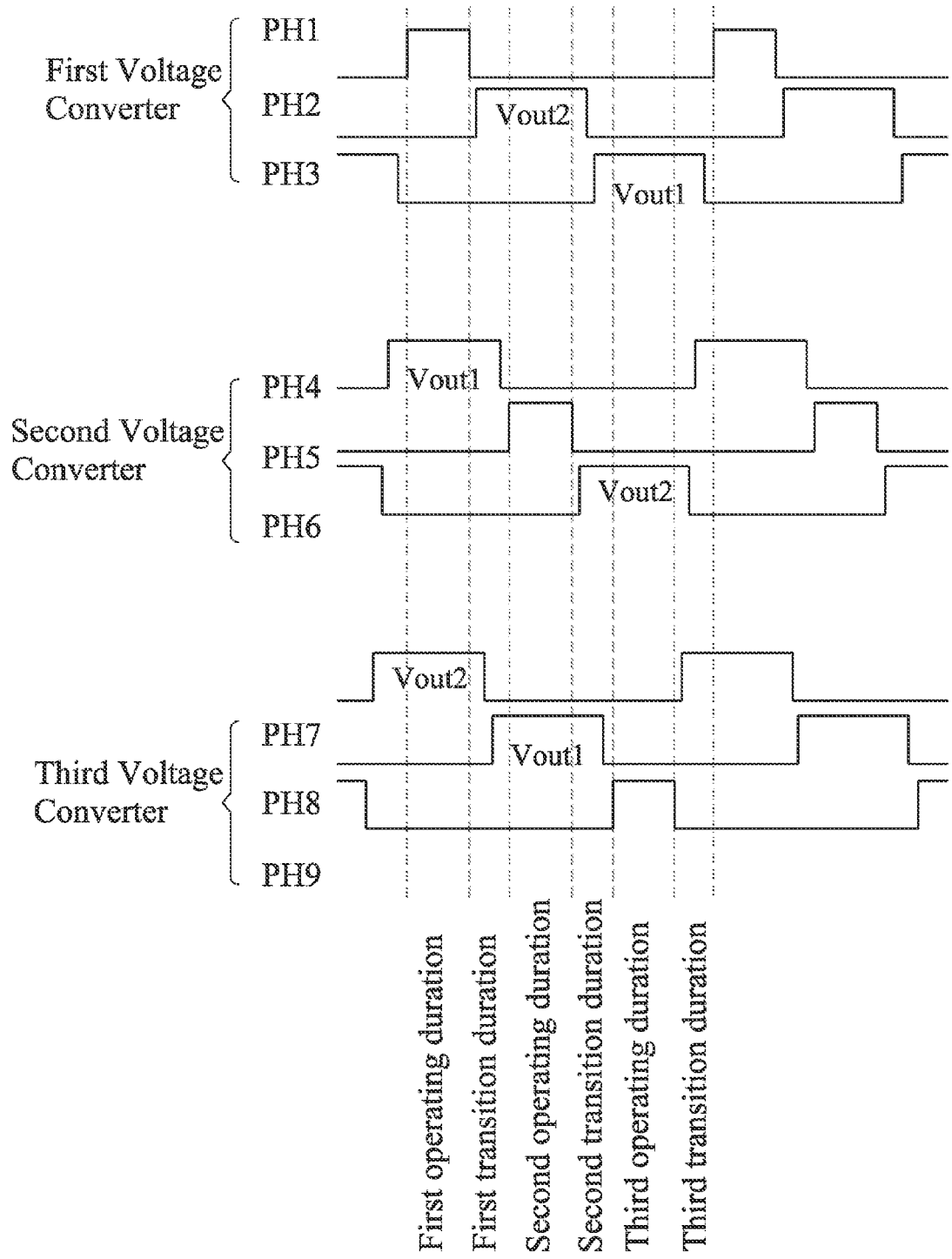
FIG. 4 is a timing diagram illustrating a first control scheme of the preferred embodiment.

Referring to FIG. 3 and FIG. 4, a first control scheme is shown in which the switch controller generates control signals PH1, PH2, PH3 for controlling respectively the charge switch pair M1, M2, the second output switch pair M5, M6 and the first output switch pair M3, M4 of the first voltage converter 2, control signals PH4, PH5, PH6 for controlling respectively the first output switch pair M3, M4, the charge switch pair M1, M2 and the second output switch pair M5, M6 of the second voltage converter 3, and control signals PH7, PH8, PH9 for controlling respectively the second output switch pair M5, M6, the first output switch pair M3, M4 and the charge switch pair M1, M2 of the third voltage converter 4. In this embodiment, a state "high" of each of the control signals PH1 to PH9 represents a state in which the corresponding switches are closed (i.e., to make electrical connection), and a state "low" of each of the control signals PH1 to PH9 represents a state in which the corresponding switches are open (i.e., to break electrical connection).

Each of the voltage converters 2, 3, 4 is controlled by the corresponding control signals to operate among a charging state, a first voltage output state and a second voltage outputs state.

In the charging state, the charge switches M1, M2 are closed, and the switches M3 to M6 are open. The capacitor C is charged to a voltage (Vc1−Vc2) across the first and second capacitor terminals thereof.

In the first voltage output state after the charging state, the first output switches M3, M4 are closed, and the switches M1, M2, M5, M6 are open. The first output voltage Vout1 is provided by the capacitor C and is outputted from the second terminal of the first output switch M4, where Vout1=Vc1−Vc2+Vin1.

In the second voltage output state after the charging state, the second output switches M5, M6 are closed, and the switches M1 to M4 are open. The second output voltage Vout2 is provided by the capacitor C and is outputted from the second terminal of the second output switch M6, where Vout2=Vin2−(Vc1−Vc2).

Magnitudes of the voltages Vc1, Vc2, Vin1 and Vin2 may be designed as required. In one example, Vc1=Vin1=VCI and Vc2=Vin2=0, so that Vout1=2VCI and Vout2=−VCI. In another example, Vc1=Vin1=VH and Vc2=Vin2=VL, so that Vout1=2 VH−VL and Vout2=2VL−VH. However, the magnitudes of the voltages Vc1, Vc2, Vin1 and Vin2 are not limited to the abovementioned examples.

Operation of the voltage converting device according to the first control scheme may be divided into six sequential durations.

Figure 5:
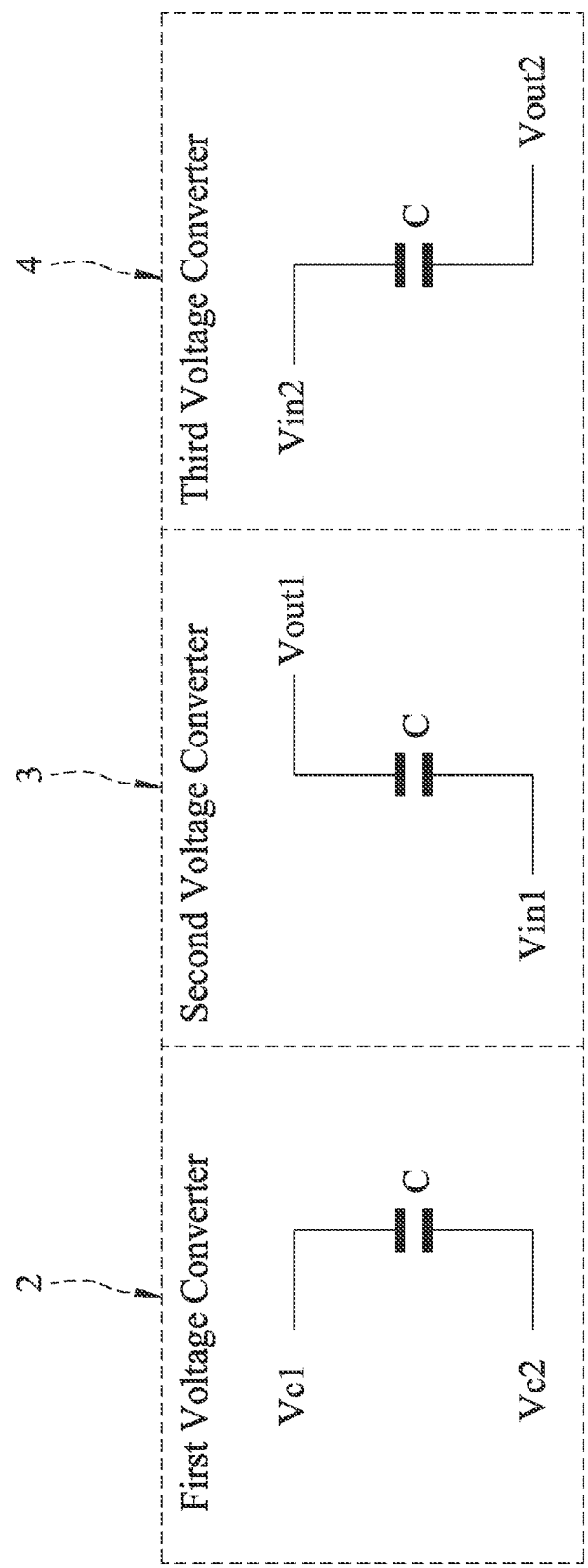
FIG. 5 is a schematic diagram showing an equivalent circuit of the preferred embodiment operating in a first operating duration using the first control scheme.

Referring to FIG. 4 and FIG. 5, in a first operating duration, the voltage converter 2 operates in the charging state to charge the capacitor C thereof, the voltage converter 3 operates in the first voltage output state to output the first output voltage Vout1, and the voltage converter 4 operates in the second voltage output state to output the second output voltage Vout2.

Thereafter, in a first transition duration, the voltage converting device operates in the following sequence: the voltage converter 2 is switched from the charging state to the second voltage output state to output the second output voltage Vout2; the voltage converter 4 is switched from the second voltage output state to the first voltage output state to output the first output voltage Vout1; and the voltage converter 3 is switched from the first voltage output state to the charging state. Since the voltage converter 2 is switched to the second voltage output state before the voltage converter 4 is switched from the second voltage output state to the first voltage output state, output of the second output voltage Vout2 is substantially continuous during the first transition duration without floating. Similarly, output of the first output voltage Vout1 is also substantially continuous during the first transition duration without floating.

Figure 6:
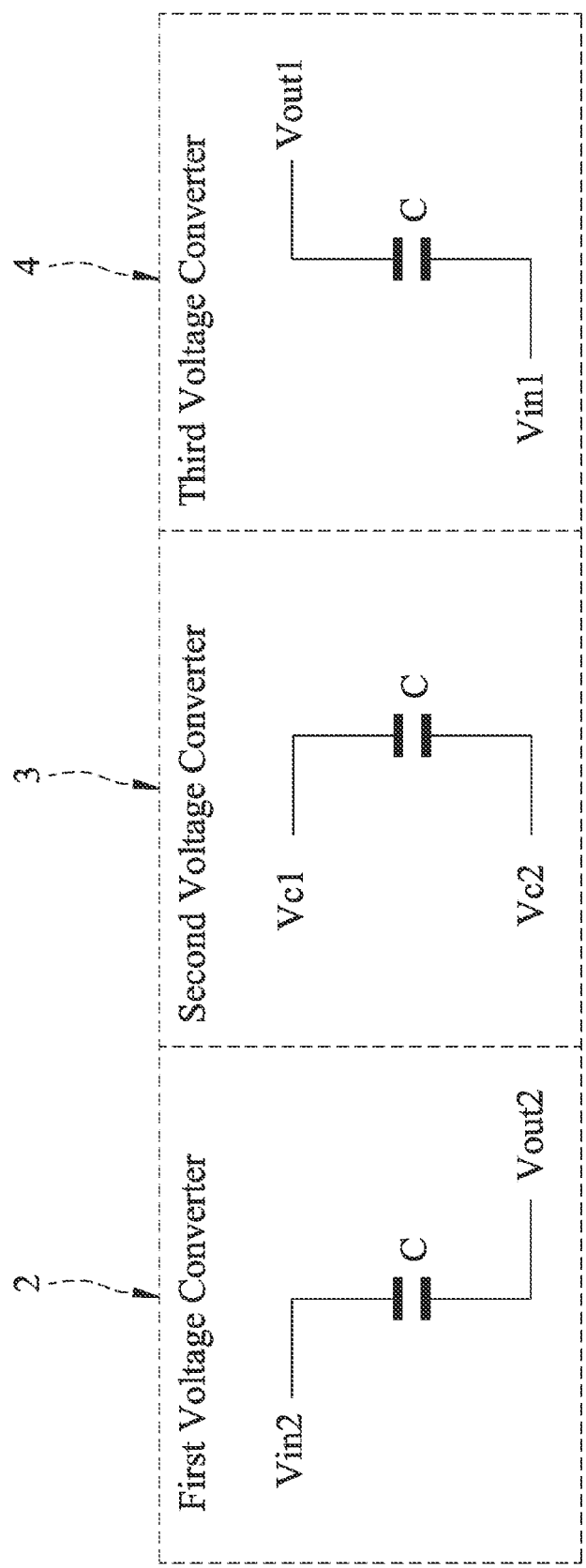
FIG. 6 is a schematic diagram showing an equivalent circuit of the preferred embodiment operating in a second operating duration using the first control scheme.

Referring to FIG. 4 and FIG. 6, in a subsequent second operating duration, the voltage converter 3 operates in the charging state to charge the capacitor C thereof, the voltage converter 4 operates in the first voltage output state to output the first output voltage Vout1, and the voltage converter 2 operates in the second voltage output state to output the second output voltage Vout2.

Thereafter, in a second transition duration, the voltage converting device operates in the following sequence: the voltage converter 3 is switched from the charging state to the second voltage output state to output the second output voltage Vout2; the voltage converter 2 is switched from the second voltage output state to the first voltage output state to output the first output voltage Vout1; and the voltage converter 4 is switched from the first voltage output state to the charging state. Since the voltage converter 3 is switched to the second voltage output state before the voltage converter 2 is switched from the second voltage output state to the first voltage output state, output of the second output voltage Vout2 is substantially continuous during the second transition duration without floating. Similarly, output of the first output voltage Vout1 is also substantially continuous during the second transition duration without floating.

Figure 7:
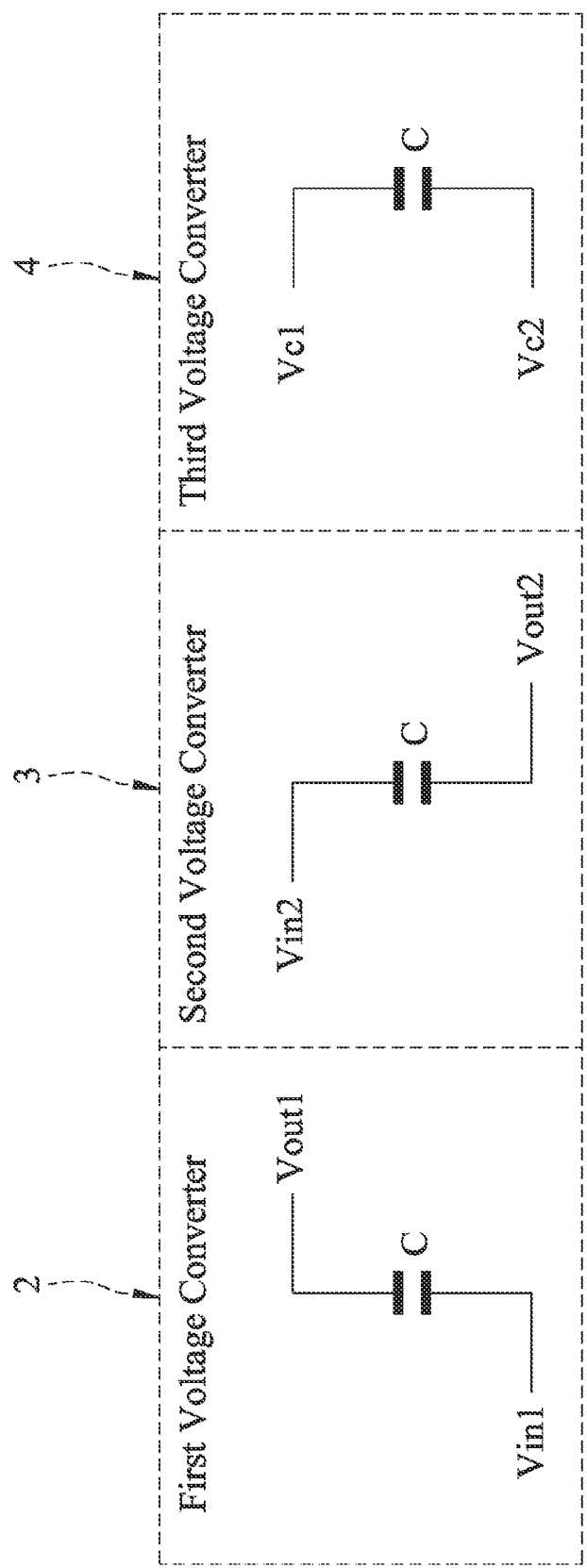
FIG. 7 is a schematic diagram showing an equivalent circuit of the preferred embodiment operating in a third operating duration using the first control scheme.

Referring to FIG. 4 and FIG. 7, in a subsequent third operating duration, the voltage converter 4 operates in the charging state to charge the capacitor C thereof, the voltage converter 2 operates in the first voltage output state to output the first output voltage Vout1, and the voltage converter 3 operates in the second voltage output state to output the second output voltage Vout2.

Thereafter, in a third transition duration, the voltage converting device operates in the following sequence: the voltage converter 4 is switched from the charging state to the second voltage output state to output the second output voltage Vout2; the voltage converter 3 is switched from the second voltage output state to the first voltage output state to output the first output voltage Vout1; and the voltage converter 2 is switched from the first voltage output state to the charging state. Since the voltage converter 4 is switched to the second voltage output state before the voltage converter 3 is switched from the second voltage output state to the first voltage output state, output of the second output voltage Vout2 is substantially continuous during the third transition duration without floating. Similarly, output of the first output voltage Vout1 is also substantially continuous during the third transition duration without floating.

It should be noted that, in the preferred embodiment, for each of the voltage converters 2, 3, 4, only one pair of said pairs of the charge switches M1, M2, the first output switches M3, M4 and the second output switches M5, M6 are closed at a time. For example, when the voltage converter 2, 3, 4 is switched from the charging state to the second voltage output state, the charge switches M1, M2 thereof are switched to be open before the second output switches M5, M6 are switched to be closed.

Accordingly, the voltage converting device controlled using the first control scheme of this invention has at least one voltage converter to output the first output voltage Vout1, and at least one voltage converter to output the second output voltage Vout2 at any time point, to thereby overcome the voltage drift issue in the aforementioned conventional switched capacitor voltage converting device.

Figure 8:
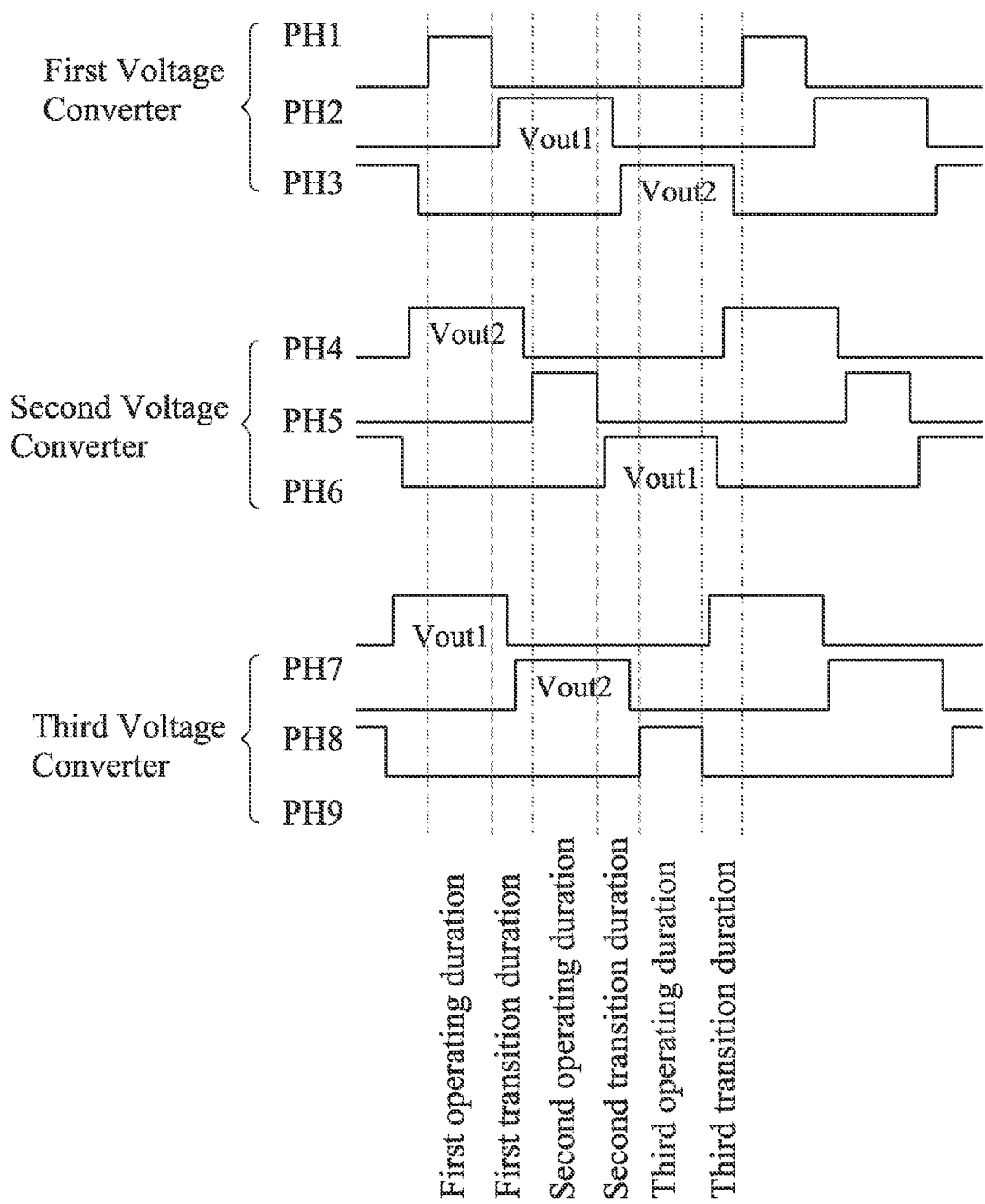
FIG. 8 is a timing diagram illustrating a second control scheme of the preferred embodiment.

Referring to FIG. 3 and FIG. 8, a second control scheme is shown in which the switch controller generates control signals PH1, PH2, PH3 for controlling respectively the charge switch pair M1, M2, the first output switch pair M3, M4 and the second output switch pair M5, M6 of the first voltage converter 2, control signals PH4, PH5, PH6 for controlling respectively the second output switch pair M5, M6, the charge switch pair M1, M2 and the first output switch pair M3, M4 of the second voltage converter 3, and control signals PH7, PH8, PH9 for controlling respectively the first output switch pair M3, M4, the second output switch pair M5, M6 and the charge switch pair M1, M2 of the third voltage converter 4.

In other words, the second control scheme differs from the first control scheme in that: for each of the voltage converters 2, 3, 4 of the voltage converting device, the control signal that controls the first output switches M3, M4 in the first control scheme are used to control the second output switches M5, M6 in the second control scheme, and the control signal that controls the second output switches M5, M6 in the first control scheme are used to control the first output switches M3, M4 in the second control scheme. Therefore, while the state switching sequence for each of the voltage converters 2, 3, 4 may be different from that in the first control scheme, the voltage converting device according to the second control scheme of this invention still has at least one voltage converter to output the first output voltage Vout1, and at least one voltage converter to output the second output voltage Vout2 at any time point due to the similar reasons described for the first control scheme, to thereby overcome the voltage drift issue in the aforementioned conventional switched capacitor voltage converting device.

It should be noted that, upon becoming aware of the timing diagram of the control signals PH1 to PH9 (e.g., FIG. 4 and FIG. 8), the switch controller should be capable of being implemented by persons having ordinary skill in the art using hardware designs (e.g., circuit design), programmable signal generation devices (e.g., FPGA), or other conventional methods, so as to generate the control signals PH1 to PH9 as illustrated in the timing diagram. Since implementation of the switch controller for generation of the control signals PH1 to PH9 is not a characterizing feature of this invention, detailed implementations of the control signals PH1 to PH9 will be omitted herein for the sake of brevity.

Accordingly, the voltage converting device of this invention employs well-arranged timing control of the voltage converters 2, 3, 4 to ensure that at least one voltage converter outputs the first output voltage Vout1, and at least one voltage converter outputs the second output voltage Vout2 at any time point, so as to eliminate the voltage drift issue encountered in the prior art. Hence, the stabilization capacitor used in the prior art may be omitted. When two output voltages are required, the prior art must use two conventional switched capacitor voltage converting devices that include 16 switches and 6 capacitors, while the present invention includes 18 switches and 3 capacitors. Although two more switches are required in the present invention, three capacitors are omitted. When the voltage converting device of this invention is implemented using an integrated circuit, area occupied by three capacitors is usually much larger than area occupied by two switches. Accordingly, the present invention results in a relatively smaller circuit area.

It should be noted that the aforementioned architecture of the preferred embodiment may be expanded to output N (N≥2) output voltages by using N+1 voltage converters. Since such detailed implementation may be readily appreciated by persons having ordinary skill in the art in light of the disclosure provided herein, details thereof are not described herein for the sake of brevity.

Figure 9:
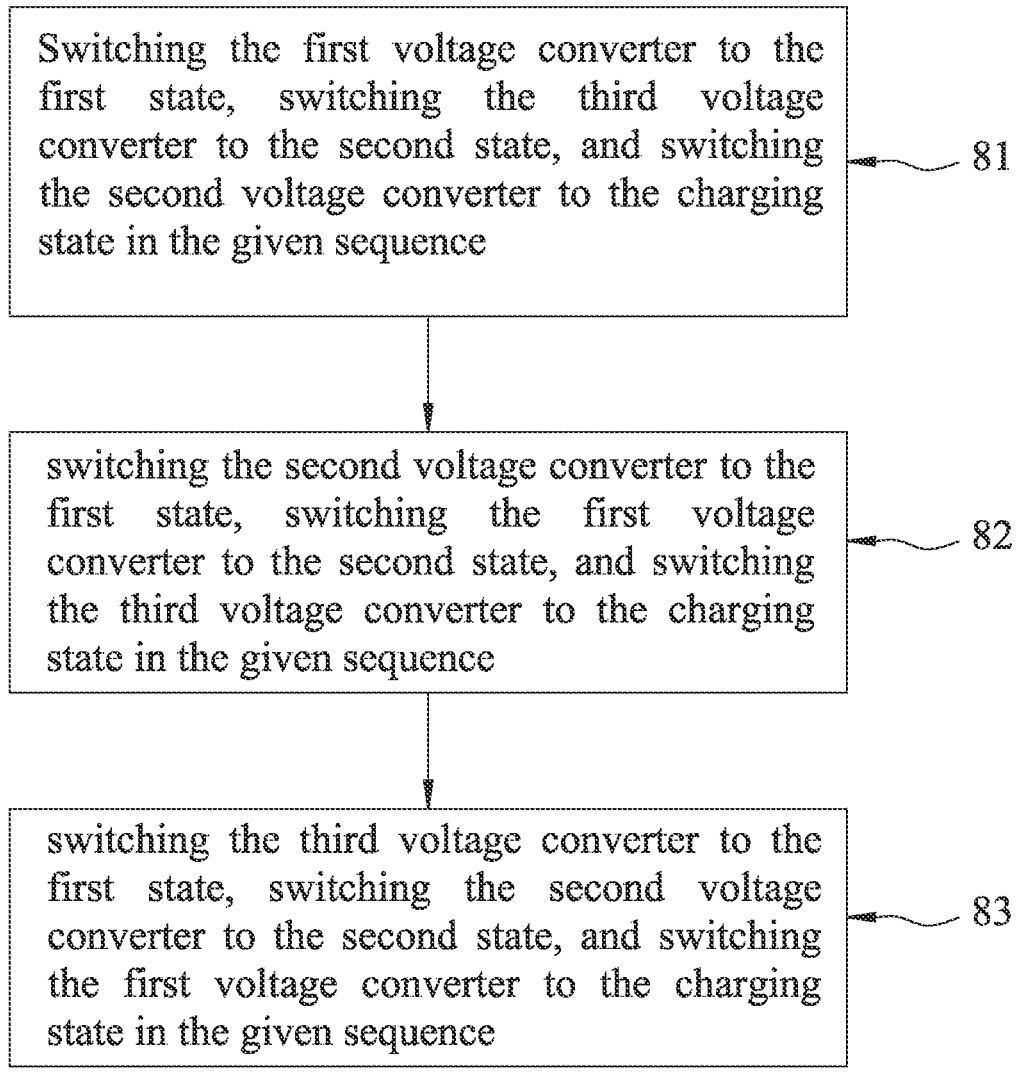
FIG. 9 is a flow chart illustrating steps of a voltage converting method implemented by the voltage converting device according to the present invention.

Referring to FIG. 3 and FIG. 9, a preferred embodiment of the voltage converting method according to the present invention is adapted to be implemented by the preferred embodiment of the voltage converting device, and includes the following steps.

Step 81: The first voltage converter 2 is switched to a first state to output one of the first output voltage (first voltage output state) and the second output voltage (second voltage output state), the third voltage converter 4 is switched to a second state to output the other one of the first output voltage and the second output voltage, and the second voltage converter 3 is switched to the charging state in the given sequence.

Step 82: The second voltage converter 3 is switched to the first state, the first voltage converter 2 is switched to the second state, and the third voltage converter 4 is switched to the charging state in the given sequence.

Step 83: The third voltage converter 4 is switched to the first state, the second voltage converter 3 is switched to the second state, and the first voltage converter 2 is switched to the charging state in the given sequence.

For the first control scheme, the first state is the second voltage output state and the second state is the first voltage output state. For the second control scheme, the first state is the first voltage output state and the second state is the second voltage output state.

To sum up, the present invention may be used to provide multiple output voltages with relatively small circuit area for saving cost, while ensuring that the output voltages do not drift.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A voltage converting device comprising a first voltage converter, a second voltage converter, and a third voltage converter, each of said first voltage converter, said second voltage converter and said third voltage converter including:
    a capacitor having a pair of capacitor terminals;
        a pair of charge switches each having a first terminal and a second terminal, said first terminals of said charge switches being coupled respectively to said capacitor terminals, said second terminals of said charge switches being disposed to receive first and second charge voltages, respectively;
        a pair of first output switches each having a first terminal and a second terminal, said first terminals of said first output switches being coupled respectively to said capacitor terminals, said second terminal of one of said first output switches being disposed to receive a first input voltage, said second terminal of the other one of said first output switches being disposed to output a first output voltage; and
        a pair of second output switches each having a first terminal and a second terminal, said first terminals of said second output switches being coupled respectively to said capacitor terminals, said second terminal of one of said second output switches being disposed to receive a second input voltage, said second terminal of the other one of said second output switches being disposed to output a second output voltage; and
    a switch controller coupled electrically to said first voltage converter, said second voltage converter and said third voltage converter,
    wherein, for each of said first voltage converter, said second voltage converter and said third voltage converter, said switch controller controls said charge switches to make electrical connection simultaneously and to break electrical connection simultaneously, controls said first output switches to make electrical connection simultaneously and to break electrical connection simultaneously, and controls said second output switches to make electrical connection simultaneously and to break electrical connection simultaneously;

wherein, for each of said first voltage converter, said second voltage converter and said third voltage converter, said switch controller controls said charge switches, said first output switches and said second output switches to make electrical connection in a predetermined sequence, and only one pair of said pairs of said charge switches, said first output switches and said second output switches make electrical connection at a time;

wherein said switch controller controls said first output switches of said first voltage converter, said second voltage converter and said third voltage converter such that output of the first output voltage is substantially continuous;

wherein said switch controller controls said second output switches of said first voltage converter, said second voltage converter and said third voltage converter such that output of the second output voltage is substantially continuous; and wherein said switch controller controls said first voltage converter, said second voltage converter and said third voltage converter in a manner that when said charge switches of one of said first voltage converter, said second voltage converter and said third voltage converter make electrical connection, said first output switches of another one of said first voltage converter, said second voltage converter and said third voltage converter make electrical connection, and said second output switches of yet another one of said first voltage converter, said second voltage converter and said third voltage converter make electrical connection.

2. The voltage converting device as claimed in claim 1, wherein:

said first terminal of said charge switch that receives the first charge voltage, said first terminal of said first output switch that outputs the first output voltage, and said first terminal of said second output switch that receives the second input voltage are coupled to a same one of said capacitor terminals; and said first terminal of said charge switch that receives the second charge voltage, said first terminal of said first output switch that receives the first input voltage, and said first terminal of said second output switch that outputs the second output voltage are coupled to the other one of said capacitor terminals.

3. A voltage converting method to be implemented by the voltage converting device as claimed in claim 1, each of the first voltage converter, the second voltage converter and the third voltage converter of the voltage converting device being operable to switch among a first state to output one of the first output voltage and the second output voltage, a second state to output the other one of the first output voltage and the second output voltage, and a charging state, said voltage converting method comprising the steps of:

a) switching the first voltage converter to the first state, switching the third voltage converter to the second state, and switching the second voltage converter to the charging state in the given sequence;

b) switching the second voltage converter to the first state, switching the first voltage converter to the second state, and switching the third voltage converter to the charging state in the given sequence; and c) switching the third voltage converter to the first state, switching the second voltage converter to the second state, and switching the first voltage converter to the charging state in the given sequence.

4. The voltage converting method as claimed in claim 3, wherein the second output voltage is outputted in the first state, and the first output voltage is outputted in the second state.

5. The voltage converting method as claimed in claim 3, wherein the first output voltage is outputted in the first state, and the second output voltage is outputted in the second state.

6. A voltage converting method to be implemented by a voltage converting device that includes a first voltage converter, a second voltage converter and a third voltage converter, each of the first voltage converter, the second voltage converter and the third voltage converter being a switched capacitor voltage converter, and being operable to switch among a first voltage output state, a second voltage output state, and a charging state, said voltage converting method comprising the steps of:

a) switching the first voltage converter to the first voltage output state, switching the third voltage converter to the second voltage output state, and switching the second voltage converter to the charging state in the given sequence;

b) switching the second voltage converter to the first voltage output state, switching the first voltage converter to the second voltage output state, and switching the third voltage converter to the charging state in the given sequence; and c) switching the third voltage converter to the first voltage output state, switching the second voltage converter to the second voltage output state, and switching the first voltage converter to the charging state in the given sequence.

* * * * *